(12) United States Patent
Springs, Jr.

(10) Patent No.: US 12,308,787 B1
(45) Date of Patent: May 20, 2025

(54) SOLAR TRACKING SYSTEM AND ENERGY NETWORK

(71) Applicant: David A Springs, Jr., Lexington, SC (US)

(72) Inventor: David A Springs, Jr., Lexington, SC (US)

( * ) Notice: Subject to any disclaimer, the term of this patent is extended or adjusted under 35 U.S.C. 154(b) by 0 days.

(21) Appl. No.: 18/786,827

(22) Filed: Jul. 29, 2024

Related U.S. Application Data

(63) Continuation-in-part of application No. 18/399,198, filed on Dec. 28, 2023, now Pat. No. 12,081,166.

(51) Int. Cl.
*H02S 20/32* (2014.01)

(52) U.S. Cl.
CPC .................................. *H02S 20/32* (2014.12)

(58) Field of Classification Search
CPC ....... H01L 31/00–078; Y02E 10/50–60; H02S 20/00–32; H02S 40/00–44; H02S 50/00–15; H10F 10/00–19; H10F 19/00–908
See application file for complete search history.

(56) References Cited

U.S. PATENT DOCUMENTS

| 7,884,308 B1 | 2/2011 | Mejia |
| 2012/0167871 A1 | 7/2012 | Falbel |
| 2017/0093329 A1 | 3/2017 | Jensen |

FOREIGN PATENT DOCUMENTS

| CN | 201392479 | 1/2010 |
| CN | 102609003 | 7/2012 |
| CN | 205195645 U | 4/2017 |
| JP | H06151934 | 5/1994 |
| JP | 2004146759 A | 5/2004 |
| KR | 20090076880 | 7/2009 |

*Primary Examiner* — Bach T Dinh
(74) *Attorney, Agent, or Firm* — Weisberg I.P. Law, P.A.

(57) ABSTRACT

A solar tracking and solar energy generation system including a solar panel apparatus, which includes a main power generating solar panel; first and second tracking wings situated on either side and on a same plane as the main solar panel, the tracking wings each having upper and lower solar panels each with solar cells, the upper and lower solar panels are offset with respect to each other by a predetermined angle; the system including a tracking motor electrically coupled to the main solar panel, the tracking motor, upon receipt of a requisite voltage, configured to move the main solar panel incrementally in a direction corresponding to the direction of the sun's motion throughout the day; and a comparator circuit electrically connected to the tracking wings, the comparator circuit configured to generate an input voltage signal to the control circuit to drive the motor.

8 Claims, 9 Drawing Sheets

SOLAR COMPARITOR WIRING

R = RED WIRE
B = BLACK WIRE

SOLAR TRACKING SYSTEM AND ENERGY NETWORK

CROSS-REFERENCE TO RELATED APPLICATIONS

This application is a Continuation In Part Application of U.S. application Ser. No. 18/399,198, filed Dec. 28, 2023 entitled "SOLAR TRACKING SYSTEM AND ENERGY NETWORK," the entirety of which is incorporated herein by reference.

TECHNICAL FIELD

This disclosure relates to solar panels and more specifically to a solar tracking system and energy network comprised of basic analog components and capable of tracking the sun and generating solar energy in an efficient manner.

BACKGROUND

Solar panel tracking systems and solar energy networks exist today in many designs and configurations. However, many of these systems and networks are complicated and expensive to build and maintain. Many require specialized components, panels and/or circuit boards. Others solar panel tracking systems become unstable on cloudy days or inclement weather and inefficiently waste energy trying to find and "chase" the sun.

What is needed is a simple, affordable, scalable and efficient motorized solar panel tracking system capable of automatically tracking the daily path of the sun while conserving energy on cloudy days until the sun returns while providing energy to various components such as batteries and inverters. The present disclosure addresses this need.

SUMMARY

In aspect of the present disclosure, a solar tracking and solar energy generation system is provided. The system includes a solar panel apparatus having a main power generating solar panel; a first tracking wing situated on a first side of and on a same plane as the main solar panel, the first tracking wing having upper and lower solar panels each including solar cells, the upper and lower solar panels are offset with respect to each other by a predetermined angle; a second tracking wing situated on a second side of and on the same plane as the main solar panel, the second tracking wing having upper and lower solar panels each including solar cells, the upper and lower solar panels are offset with respect to each other by a predetermined angle; a tracking motor electrically coupled to the main solar panel, the tracking motor, upon receipt of a requisite voltage, configured to move the main solar panel incrementally in a direction corresponding to the direction of the sun's motion throughout the day; and a comparator circuit electrically connected to the tracking wings, the comparator circuit configured to generate an input voltage signal to the control circuit to drive the tracking motor, the input voltage signal generated when a lower solar panel on one tracking wing receives more sunlight than a lower solar panel on an opposing tracking wing by a predetermined amount.

In another embodiment of this aspect, the solar cells on the upper solar panel of each tracking wing are electrically connected in parallel with the solar cells on the lower solar panel of the same tracking wing.

In another embodiment, the solar panels of the first tracking wing are electrically connected in series with the solar panels of the second tracking wing.

In another embodiment, the upper and lower solar panels are offset with respect to each other by a predetermined angle of substantially 90 degrees.

In another embodiment, the system further includes a digital programmable timer with an internal relay switch to limit the solar tracking system to discrete operational time intervals.

In another embodiment, the system includes an override motor circuit applied to make seasonal adjustments for the angle of the sun over the horizon.

In another embodiment, the system includes a manual adjustment to account for change in the arc of the sun through the seasons due to the tilt in the earth's axis.

DETAILED DESCRIPTION OF EXEMPLARY EMBODIMENTS

The present disclosure provides a solar panel tracking system and energy network that is scalable and comprised of readily available components and that is inexpensive to build and easy to maintain. Further, the system's electrical components are mostly analog. The solar panel tracking system and energy network is capable of providing electrical power to various electrical components. In one embodiment, the solar panel tracking system of the present disclosure is capable of maintaining 12 volt batteries of various sizes and amp hours. In another embodiment, the solar panel tracking system and energy network can provide electrical power to 12 volt applications, such as an inverter, either off an individual battery or off of all batteries in the energy network, as required, The solar panel tracking system and energy network of the present disclosure is capable of maintaining stability even on a cloudy day, and by the use of a programmable digital timer, the system will not waste energy trying to find and chase the sun. The solar panel tracking system and energy network of the present disclosure is a motorized tracking system capable of automatically tracking the daily path of the sun. In one embodiment, it includes an override motor circuit applied to make seasonal adjustments for the angle of the sun over the horizon. In one embodiment, the system and its panels are capable of being manually adjusted to account for the change in the arc of the sun through the seasons due to the tilt in the earth's axis.

One portion of the present disclosure includes a main energy-producing solar panel, which upon receipt of sunlight, produces energy capable of powering batteries, inverters or other components. Another portion of the present disclosure is a solar panel tracking system comprised of multiple smaller solar panels mounted on frames arranged such that when sunlight shines on one panel more than another, a voltage is generated, which powers a relay system that ultimately powers a motor, which moves incrementally, in turn moving the main solar panel in a direction that follows the movement of the sun. Thus, the tracking portion of the present disclosure "follows the sun" so that the main solar panel is moving incrementally throughout the day to a position where it receives the most sunlight, and thus generates the most energy.

Figure 1A:
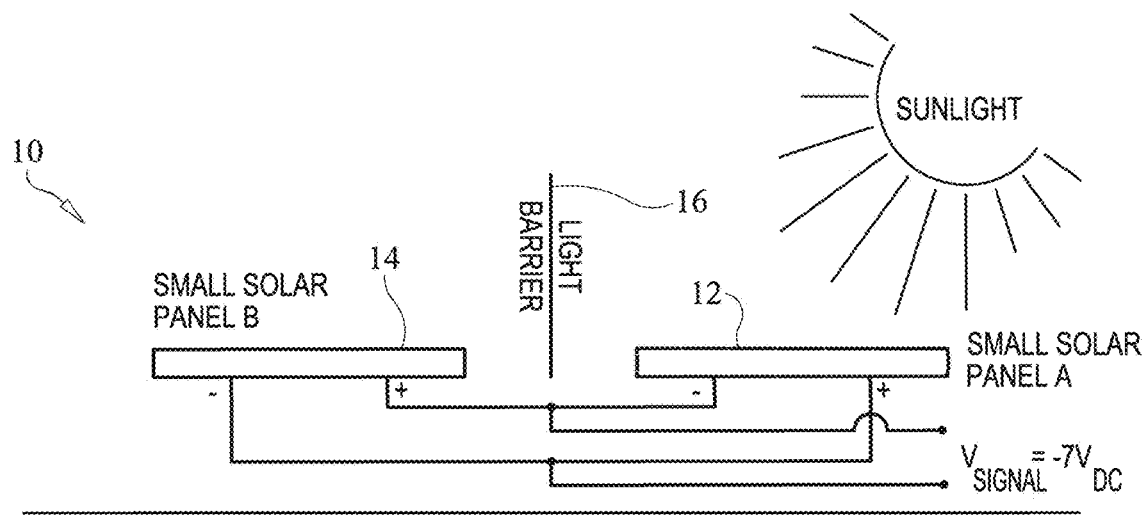
FIG. 1A is an illustration of a solar tracking analog comparator circuit of the present disclosure in the morning with the sun's rays shedding more light on Panel A of the comparator than on Panel B.
Figure 1B:
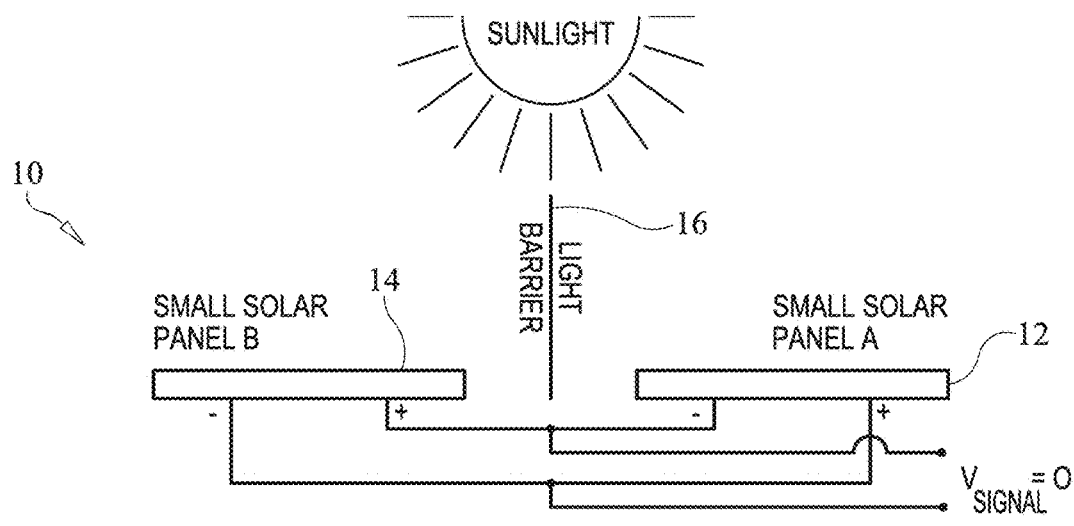
FIG. 1B is an illustration of a solar tracking analog comparator circuit of the present disclosure with the sun directly overhead and the sun's rays striking each panel substantially equally.
Figure 1C:
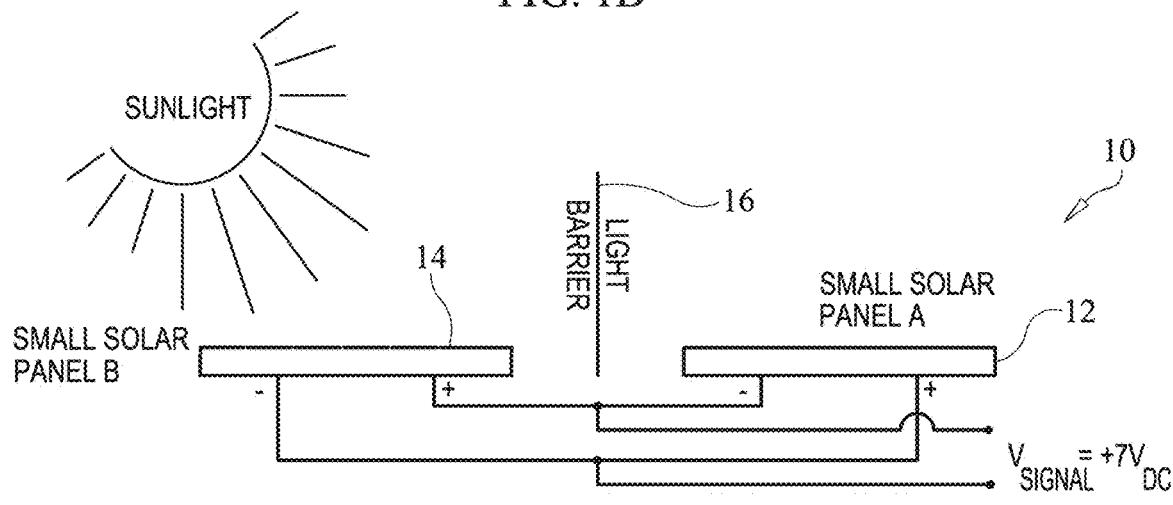
FIG. 1C is an illustration of a solar tracking analog comparator circuit of the present disclosure later in the morning with the sun's rays shedding more light on Panel B of the comparator than on Panel A.

Referring now to FIGS. 1A-1C, a solar tracking analog comparator circuit 10 of the present disclosure is shown. The comparator circuit 10 is an analog control circuit that includes two small tracking solar panels, panel A 12 and panel B 14, separated by a light barrier 16. Light barrier 16 represents the shadow of panel A 12 on panel B 14. The analog control circuit takes advantage of a −7V DC to a +7V DC differential input signal. The circuit for the differential input signal is created using two sets of tracking solar panels A 12 and B 14 connected in series to each other. In one non-limiting embodiment, each set of solar panels A 12 and B 14 are designed with a maximum output of 7 Volts DC and 40 milliamps.

FIG. 1A represents a moment in time, i.e., the morning sometime after sunrise when the sun has not yet moved towards the upper sky. In this scenario, the sun's rays strike panel A 12 while casting a shadow or partial shadow on panel B 14. In this instance, the control circuit generates Vsignal=−7 Volts DC.

In FIG. 1B, when the sun is directly overhead, tracking solar panel A 12 and tracking solar panel B 14 receive relatively equal amounts of light from the sun. This may occur, for example, at mid-day when the sun is directly overhead and its rays not obstructed by clouds or objects. In this scenario, because of rotating currents between panel A 12 and panel B 14, $V_{signal}$=0. Because, in the embodiment depicted in FIG. 1B, the sun is overhead, there is no need for the motor to adjust the position or tilt of the main solar panel and thus $V_{signal}$=0.

In FIG. 1C, the sun has moved past the overhead position as it approaches late afternoon towards sunset. Here, the sun shines more on panel B 14 and casts a shadow or partial shadow on panel A 12, resulting in $V_{signal}$=+7 Volts DC. The positive voltage results in moving the motor in an opposite direction as it moved in the scenario discussed above and shown in FIG. 1B. This could be, for example, in the afternoon, as the sun lowers in the sky and moves towards sunset. Again, the result would be that the motor moves the entire solar panel system including the main energy generation panel towards the sun in order to capture the optimal amount of the sun's rays.

Figure 1D:
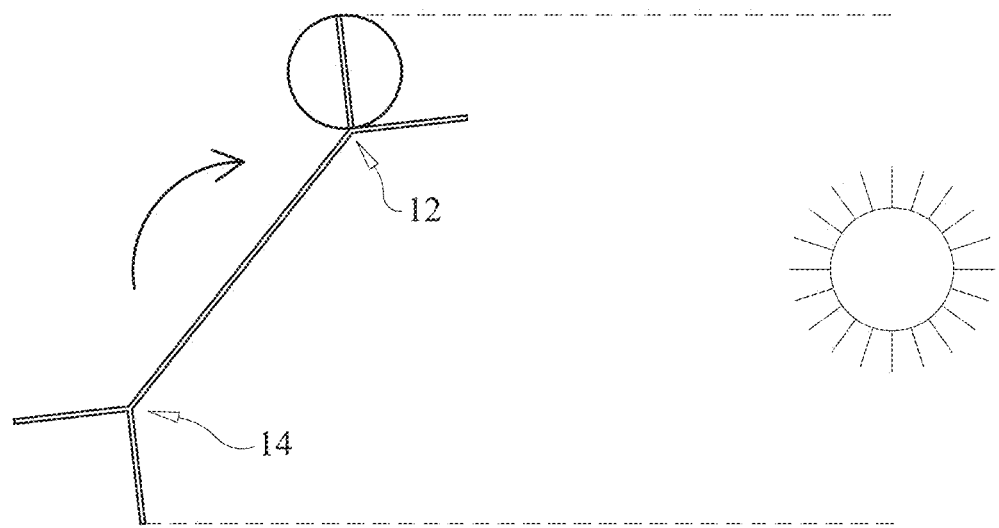
FIG. 1D is an illustration of the solar tracking analog comparator circuit of the present disclosure showing substantially parallel rays of the morning sun striking the upper right solar panels.
Figure 1E:
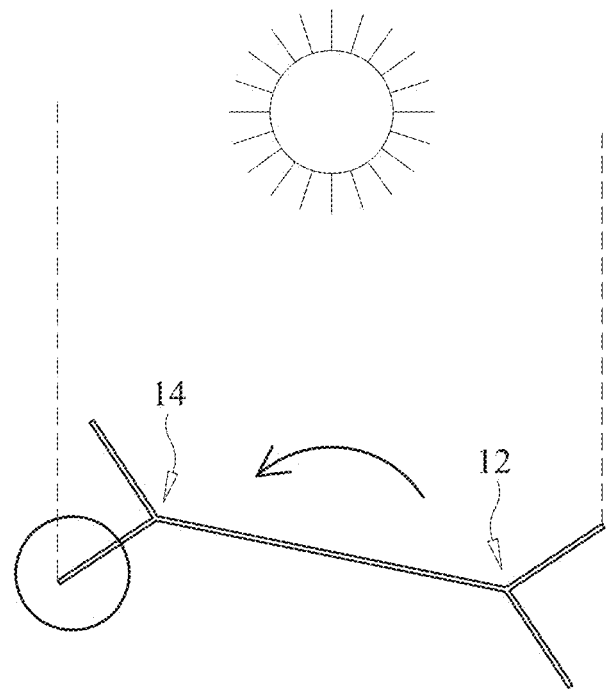
FIG. 1E is an illustration of the solar tracking analog comparator circuit of the present disclosure showing substantially parallel rays of the sun directly overhead striking the lower left solar panels.

While FIGS. 1A-1C show radial sunlight upon comparator circuit 10, FIG. 1D and FIG. 1E depict nearly parallel sunlight rays upon comparator circuit 10. FIG. 1D is an illustration of comparator circuit 10 as it begins to move back to face the early morning sun, at near full voltage. In one embodiment, each panel A 12 and B 14 are comprised of "tracking wings." Because of its distance from the earth, the sun's rays can be considered to be substantially parallel, and this is shown in FIG. 1D. In this view, a voltage $V_{signal}$ is created due to the sun's rays striking on the topmost tracking wing of panel A 12 while not striking the tracking wings on panel B 14.

In FIG. 1E, the sun has moved overhead and comparator circuit 10 continues to follow the sun, moving in the same direction as the sun moves and operating around the transition voltage of approximately 3 volts. In this scenario, once again the sun's rays are deemed to be substantially parallel due to the sun's distance from the earth.

In one embodiment of the present disclosure, described in greater detail below and depicted in FIGS. 2-7, the solar tracking system and energy network of the present disclosure uses two sets of tracking "wings" 22a and 22b each comprised of two tracking panels 24 to track and follow the sun. If the sun shines more on one tracking panel 24 (e.g., a lower tracking panel) of one tracking wing, e.g., 22a, more than another tracking panel 24 (e.g., a lower tracking panel) of the opposite tracking wing, e.g., 22b, a voltage, either positive or negative, is generated, and is used as the input voltage to a control circuit, which powers a set of relays which ultimately powers the tracking motor which moves the entire panel apparatus, including the main solar panel, incrementally, in the direction of the sun. An exemplary control circuit of the present disclosure is discussed in further detail below and shown in FIG. 8.

In one embodiment of the present disclosure, the tracking panels 24 of each tracking wing 22a and 22b are offset with respect to each other at a certain angle, for example, 90 degrees. This is discussed in further detail below and shown in FIGS. 2-7.

Figure 2:
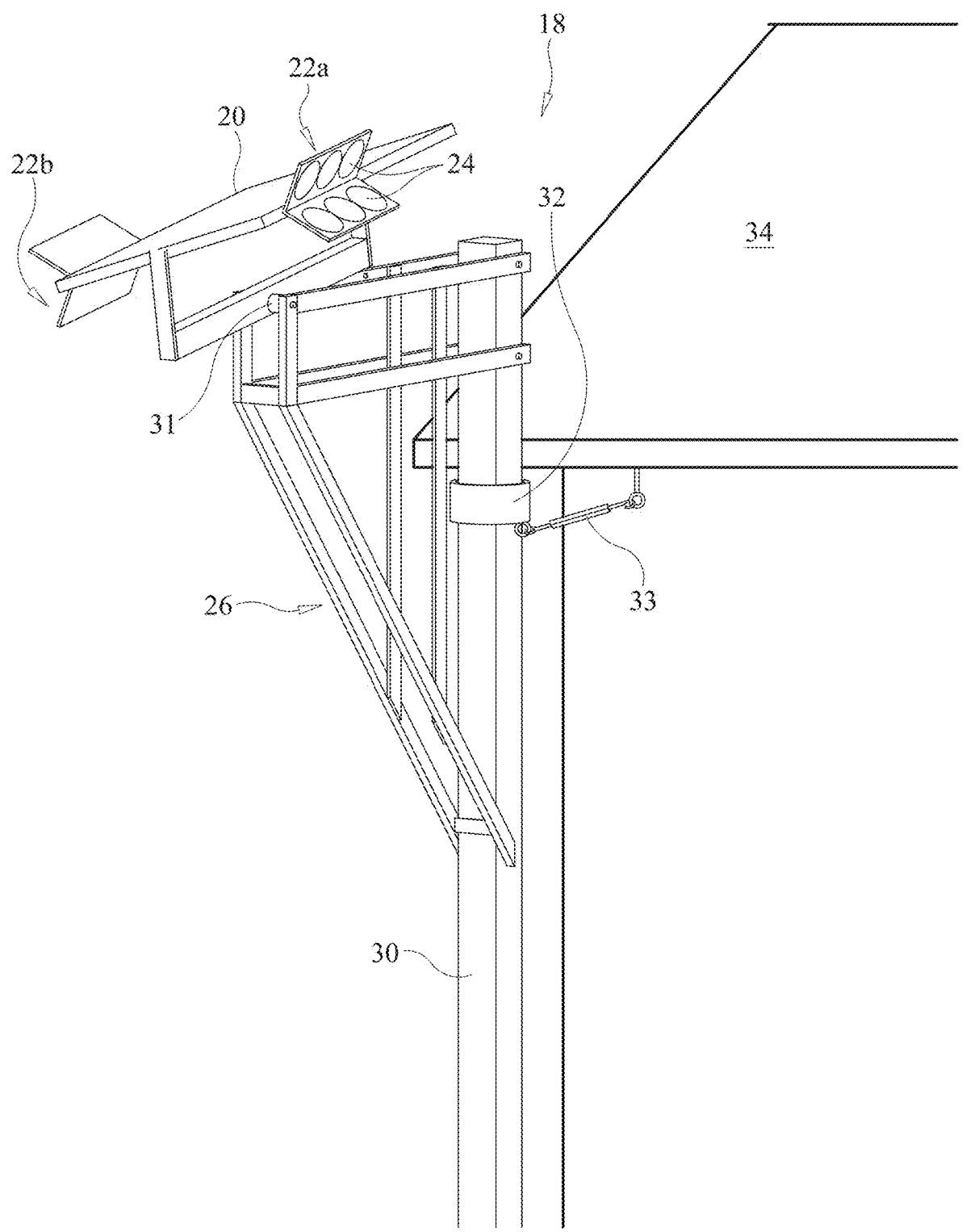
FIG. 2 is an illustration of the panel arrangement of the solar panel tracking system and energy network of the present disclosure.

Referring now to FIG. 2, the solar tracking system and energy network 18 (also referred to herein as "system 18") of the present disclosure can be seen. System 18 includes an arrangement of multiple solar panels. In one embodiment, these includes a main energy generation panel (or "main panel") 20 comprised of silicon cells, which receives sunlight from the sun and converts the sunlight into electrical energy. The sun's rays contact main panel 20 and create and electric field. As is known in the art, the generated electrical current flows from the silicon cells to wires that deliver the electricity via wires to one or more batteries (not shown). Inverters may be used to convert the current from DC to AC, and the AC current used to provide power to lights or other devices that require AC power.

In one embodiment, the arrangement of solar panels also includes a pair of tracking "wings" 22a and 22b (referred to collectively as "wings 22"), each of which are situated at either side of and coplanar with main panel 20. Each tracking wing 22 includes two tracking panels 24. In the embodiment shown in FIG. 2, each tracking wing 22 includes a pair of tracking panels offset from each other by a predetermined angle. In one non-limiting embodiment, this angle is substantially 90 degrees. In one embodiment, each tracking panel 24 includes multiple solar cells. In one embodiment, the solar cells of one tracking panel 24 and the solar cells of the opposing tracking panel 24 are electrically connected in parallel with each other. Further, the solar cells that comprise the tracking panels 24 of tracking wing 22a are connected in series with solar cells that comprise the tracking panels 24 of tracking wing 22b.

Solar tracking system and energy network 18 includes a support structure 26, which can include various components to affix solar tracking system and energy network 18 to an object such as the side of a house or shed, or other object. In the non-limiting example shown in FIG. 2, system 18 is affixed to the side of a shed. It should be noted that the electrical wiring and circuitry including the control circuit that powers the tracking motor is not shown in FIGS. 2-7. The arrangement and number of panels shown in FIG. 2 is exemplary only. For example, more tracking wings 22 may be included and the number and size of each solar cell on each panel 24 of each tracking wing 22 and can vary. Further, the angle of each tracking panel 24 on tracking wing 22 with respect to the other tracking panel on the same tracking wing 22 may also vary. This angle could depend on several factors, for example, the location of system 18 (in the southeast, or in the northwest, where sun rises and sets at different times), the season, etc.

It should be noted that tracking wings 22a and 22b on either side of main solar panel 20 remain in place, i.e., are rigidly affixed to and do not move with respect to main solar panel 20. Thus, when the motor moves main panel 20, tracking wings 22a and 22b move along with main panel 20 in a corresponding direction.

In use, the panels 24 of tracking wings 22a and 22b serve to "find" the sun, as explained above. For example, when sunlight strikes an upper panel, e.g., upper panel 24 of tracking wing 22a, while a lower panel, e.g., lower panel 2 of tracking wing 22b remains in shadow, a positive or negative voltage is generated. As described above, this voltage drives a control circuit comprised of relays and diodes, as well as a tracking motor. The result is that the tracking motor receives a voltage which moves it incrementally, and which in turn moves main panel 20 in a direction towards the latest position of the sun in the sky. This is discussed in further detail below.

In the embodiment depicted in FIG. 2, there are four sets of tracking panels 24, i.e., two sets of tracking panels 24 comprising tracking wing 22a on one side of main panel 20 and, similarly, two sets of tracking panels 24 comprising tracking wing 22b on the opposite side of main panel 20. The solar cells of the panels 24 of tracking wings 22a and 22b are designed to be able to collect the sunlight from the sunrise horizon to the sunset horizon (discussed in greater detail below and shown in FIGS. 3-7).

As mentioned, in one embodiment, the two tracking panels 24 comprising each tracking wing 22a and 22b are offset with respect to each other by a predetermined angle. In one embodiment, this angle is approximately 90 degrees. The result of this orientation of panels 24 is having the solar cells 24 in either the upper panel or the lower panel 24 of each tracking wing 22 receive light from the sun while a measured shadow is cast on the solar cells 24 in the lower panel of each tracking wing 22. This results in one of the panels 24 (either the upper or lower) always receiving sun (on a sunny day). If there is enough difference in the amount of sunlight striking one of the panels 24 (i.e., upper panel) of one tracking wing 22 (e.g., 22a) compared to the amount of sunlight striking one of the panels 24 (i.e., lower panel) of the other tracking wing 22 (e.g., 22b) a requisite voltage, $V_{signal}$ is generated by a comparator circuit. The voltage signal $V_{signal}$ operates as an input to the control circuit shown in FIG. 8, resulting in the incremental movement of the tracking motor, which moves system 18 including main panel 20 in a direction following the sun's movements throughout the day from sunrise to sunset.

It should be noted that due to the 90 degree offset arrangement between panels 24 of each tracking wing 22, when one panel of tracking wing 22 is face up, the other is face down. As mentioned above, the advantage of this arrangement of tracking panels is, for example, when the solar cells on the lower panel 24 of tracking wing 22a cannot "find the sun," the solar cells on the upper panel 24 of tracking wing 22a can. As shown in FIG. 2, the solar cells on the upper panel 24 are facing down and are designed to detect the rays of the sun independently when the tracking system is near one of its tracking limits, for example, sunset or sunrise.

As seen in FIG. 2, system 18 and its panels, is situated above and offset from a pivot point 31 that allows for a motorized readjustment of system 18 and its panels due to the seasonal arc of the sun. In certain embodiments, to counteract the imbalance of weight above the pivot point 31, a counterbalance weight (not shown) can be added at the pivot point 31 to neutralize any imbalance and reduce the impact that torque may have on the motor. The counterbalance weight can also serve a second purpose, that of a damper. Thus, instead of fluttering in a high wind, the entire system 18 will only move slightly along with its support pole 30.

In one embodiment, a pole collar 32 is situated at the top of the support pole 30. The pole collar 32 is securely mounted to a structure 34, such as a building with, in one embodiment, one or more adjustable tensioners 33. The support pole 30 runs through the collar 32 but need not be anchored to the collar 32. Advantageously, the pole collar 32 provides multiple advantages to the performance of the overall system 18. Initially, pole collar 32 prevents the support pole 30 from bending forward due to the weight imbalance caused by the panels of system 18. In addition, pole collar 32 allows system 18 and the support pole 30 to be safely secured to the side of the building in the case of strong winds. Further, because of the tilt of the earth on its axis, a manual adjustment may be required from time to time in order to have system 18 and its panels effectively track the sun. This adjustment may be accomplished by allowing the support pole 30 to be manually rotated on its axis. Pole collar 32, which is mounted to the building, allows the support pole 30 and system 18, to rotate as needed, without sacrificing stability.

Figure 3:
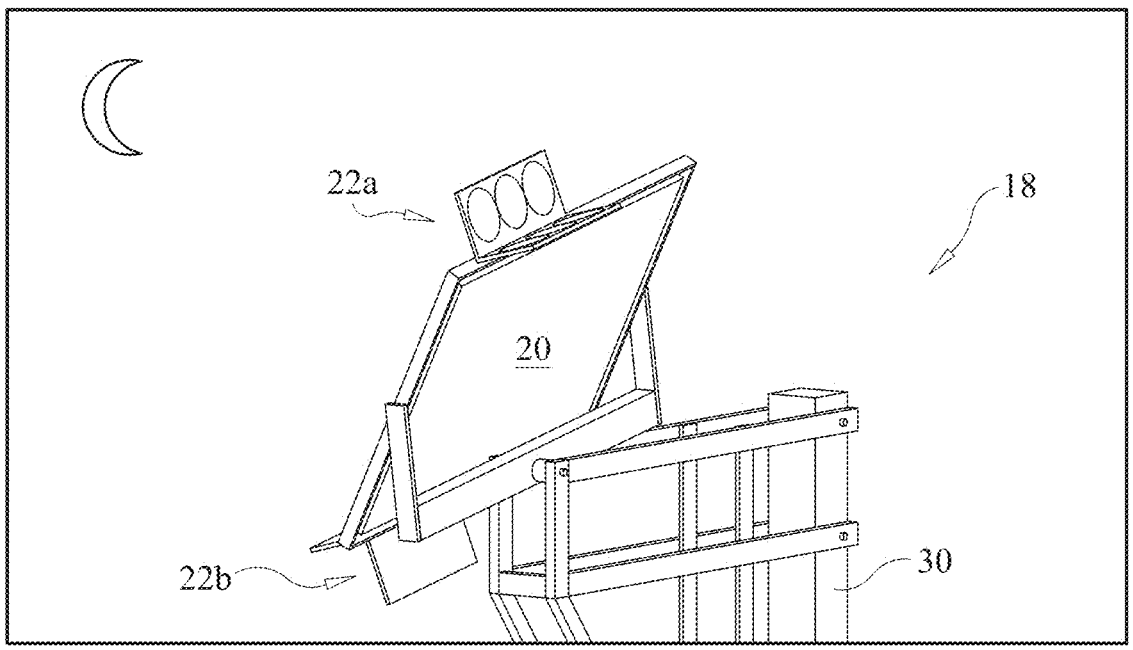
FIG. 3 illustrates the panel arrangement of the solar panel tracking system and energy network of the present disclosure before sunrise.

FIGS. 3-7 show how system 18 and its panels moves throughout the day as the sun moves, from nighttime and sunset, to sunrise the following day, and finally to sunset once again. FIG. 3 shows the position of system at nighttime after sunset and there is no further movement of the panels as no sunlight is detected. System 18 remains in the position it was at sunset on the previous day. In one embodiment, this position can be preset with the use of one or more limit switches, which stops the tracking motor at various preset positions. As shown in FIG. 3, system 18 includes main solar collecting main energy generation panel 20 with tracking wing 22a on one side of main panel 20 and tracking wing 22b on the opposite side of main panel 20. Each wing 22 includes upper and lower tracking panels, each of which contains a plurality of solar cells. System 18 is supported by support pole 30 as discussed above.

Figure 4:
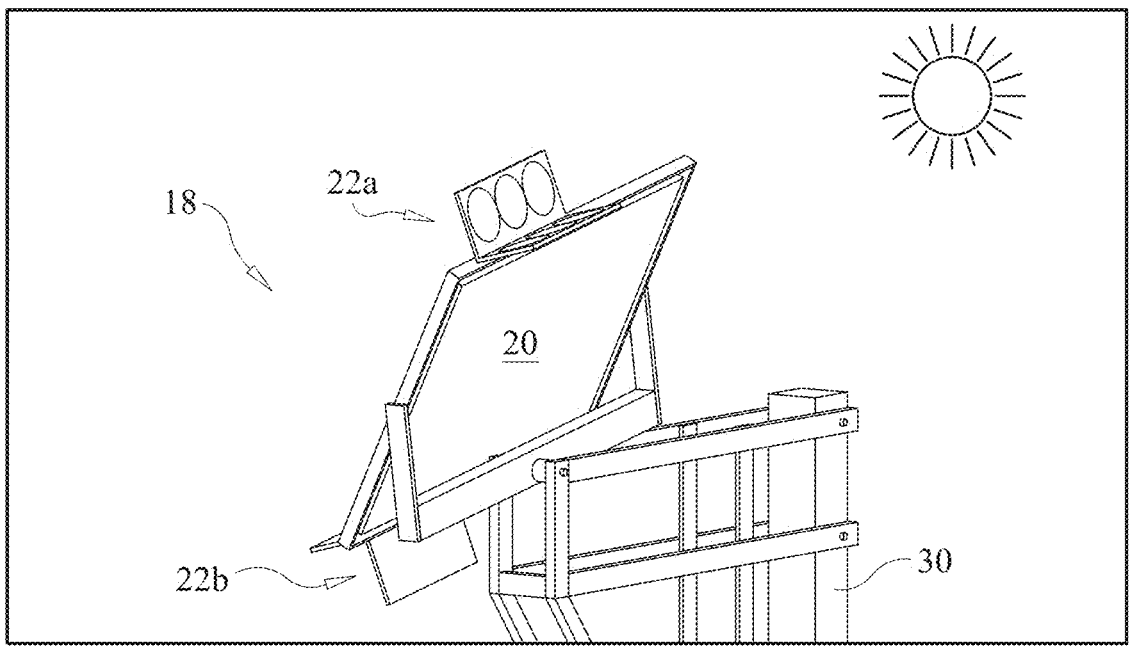
FIG. 4 illustrates the panel arrangement of the solar panel tracking system and energy network of the present disclosure at sunrise when the tracking panels detect sunlight at the opposite horizon.
Figure 5:
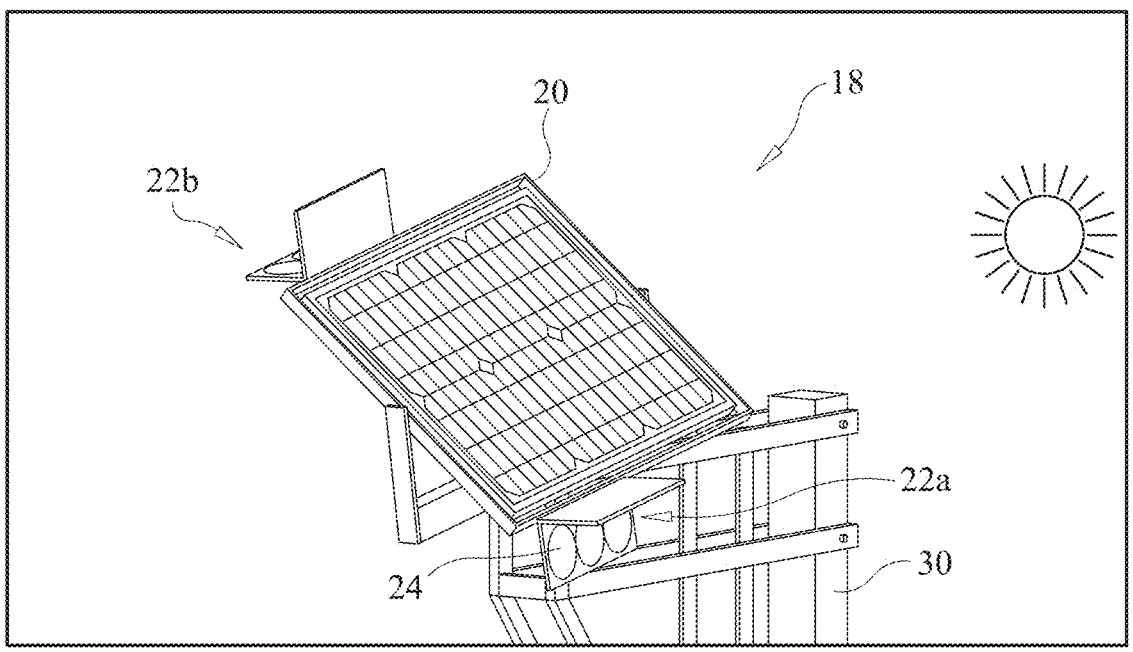
FIG. 5 illustrates the panel arrangement of the solar panel tracking system and energy network of the present disclosure at sunrise after sun has been detected and the panels have adjusted to the sun.

Referring now to FIG. 4, system 18 is in the same position it was during the night, in FIG. 3, with the sun now appearing in the opposite horizon. At sunrise, or as the sun rises, sunlight strikes the solar cells in upper panel 24 of tracking wing 22a facing the sun. Because sunlight strikes the upper panel of wing 22a and the lower panel of wing 22b is in shadow or partial shadow, a negative voltage $V_{signal}$ is generated. This voltage is input to the relays of the control circuit, which "wakes up" system 18 by activating the tracking motor which moves system 18 and its panels, essentially "flipping" system 18 from the sunset orientation depicted in FIG. 3 to a sunrise position, shown in FIG. 5.

A cloudy day can keep solar tracking equipment from operating correctly resulting in tracking instability. As clouds block the sun, the equipment can either not operate or start following the halo of the sun around the clouds and then track back to the sun. This activity wastes generated solar power and can generate excess heat in solid state devices as they transition on an off. To counter this, solar tracking system 18 of the present disclosure is allowed to operate only a discrete number of times per day, and for limited durations. To accomplish this, a digital programmable timer with an internal relay switch is added in series with a supply battery and the tracking panels of system 18.

In the following use-based embodiment, solar tracking system 18 operates 16 times a day. Since the daylight hours vary depending on where, geographically, tracking system 18 is located, in order to program the digital timer, a few rules can be adopted to account for the location that tracking system 18 is operating in and the season. For example, in the Southeast region of the United States, in the summer, productive solar generating hours are typically from 9:00 AM till 7:00 PM. Based on this, there are approximately 10 generating hours in a summer day in the Southeast region of the United States.

In one embodiment, another rule is determined by finding out how many degrees main panel 20 needs to move to keep up with the sun for each program in the timer. Since the earth rotates 360 degrees in 24 hours, the following ratio applies: 360 degrees/24 hours=15 degrees per hour or 10 degrees in 40 minutes. There are fifteen 40 minute increments in 10 hours. If the timer has its first operation at 8:55 AM, then 15 operations will allow the tracker to cover 160 degrees in the 10 hours of productive solar generation ending at 6:55 PM. In one embodiment, each travel limit on the solar tracker is set at 10 degrees above the horizon. Thus, in one embodiment, the first program (8:55 AM) runs for 4 minutes (this is a variable time period) to allow the main panel 20 to return from a setting sun position (FIG. 3 to a rising sun position (FIG. 5), i.e., approximately 160 degrees. The remaining 15 programs have a one minute interval which easily covers the 10 degrees. If there is a program operation during when clouds are present, the operation time allows the tracker to cover the 20 degrees. In another embodiment, there could be 16 separate 37.5 minute operations covering the 10 hours. The present disclosure is not limited to the number of or length of operations.

Since system 18 is driven by the sun, system 18 will operate only if the sun is available during a programmed operation. If the sun is covered by a cloud, system 18 will likely not move during an operation. If the sun returns during the next programmed operation, system 18 will "catch up" to the sun. On overcast days, system 18 will move panel 20 towards the brightest part of the sky where it will remain until the sun returns.

In one embodiment, to account for seasonal solar changes, solar tracking system 18 has an additional circuit with motor control for seasonal changes of the sun's orientation in the sky. It also has a manual adjustment to compensate for changes to the arc of the sun due to the tilt of the earth axis.

Referring to FIG. 4, at sunrise, the sun's rays strike the upper panel (facing the sun) of tracking wing 22a while the lower panel is in shadow. This creates a voltage offset via the comparator circuit as discussed above, which activates the motor, which then moves the main panel 20 (and all panels affixed to main panel 20) to the position shown in FIG. 5. The movement of system 18 from the position shown in FIG. 4 to the position shown in FIG. 5 happens relatively quickly. Here, all the voltage generated is due to the sun's rays striking the solar cells on the upper panel of wing 22a, and the panels of wing 22b do not contribute to the creation of the offset voltage since they are not receiving sunlight. Once the panels are situated in the orientation shown in FIG. 5, with main panel 20 directly facing the sun, the panels will move more slowly as they track the path of the sun as it moves from the sunrise position of FIG. 5 to the overhead position at mid-day shown in FIG. 6. The goal that is accomplished by system 18 is to orient main panel 20 so that is directly facing the sun, in order to generate the maximum amount of electricity.

Referring again to FIG. 5, at sunrise, the sun strikes the lower solar panel 24 of the tracking wing 22a now facing in the sun's direction, and a shadow or partial shadow is cast upon the lower panel of tracking wing 22b. Because these respective panels are electrically connected in series, a voltage is generated, in this case a positive voltage $V_{signal}$ and the tracking motor starts to incrementally move system 18 including main panel 20 in the opposite direction (i.e., opposite from the direction system 18 moved at sunrise to "wake up", i.e., from FIG. 4 to FIG. 5), in alignment with the sun's movement.

Figure 6:
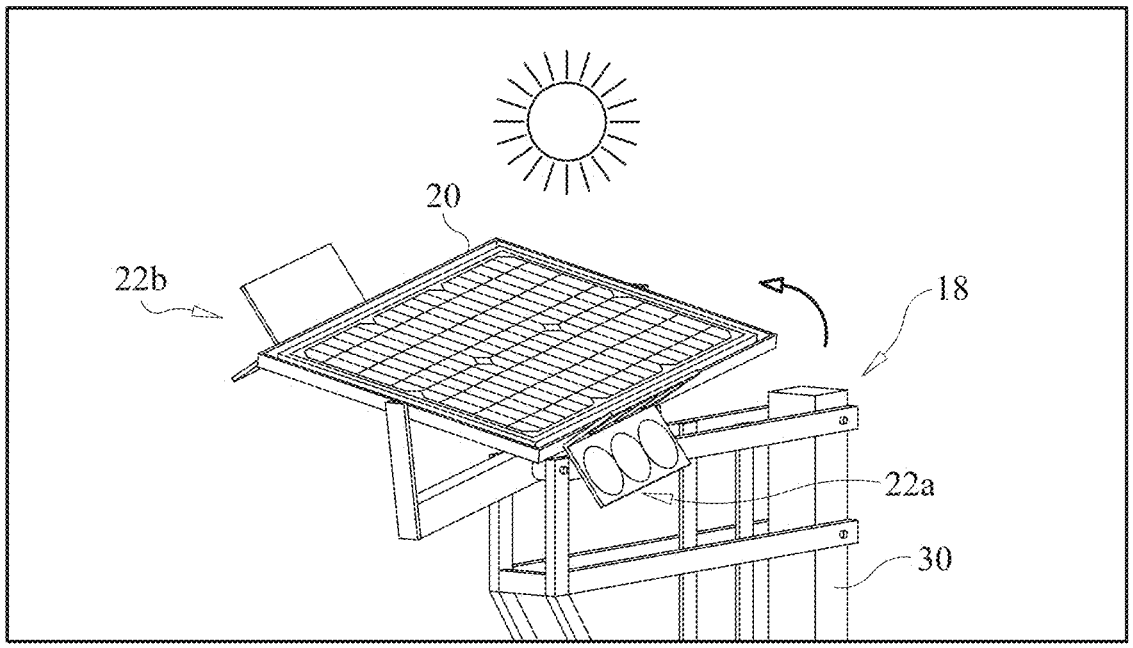
FIG. 6 illustrates the panel arrangement of the solar panel tracking system and energy network of the present disclosure at midday.

In FIG. 6, the sun has risen to a point representing mid-day. Tracking panels 22a and 22b have followed the sun's path in the direction of the arrow, as described above, and main panel 20 is now receiving direct sunlight. In this scenario, the comparator circuit does not generate an input voltage ($V_{SIGNAL}$=0) and main panel 20 remains stationary. As the sun moves from its overhead position towards the afternoon sky, this movement is detected by tracking wings 22a and 22b and the comparator circuit as described herein, and system 18 and main panel 20 continues to move in accordance with the sun's motion. Advantageously, by utilizing multiple sets of tracking wings 22, i.e., 22a and 22b, each having an upper and lower tracking panel, system 18 is always able to "find the sun" since the sun's rays will strike at least one of the solar cells on the panels of one of the two tracking wings 22a and 22b throughout the day.

Figure 7:
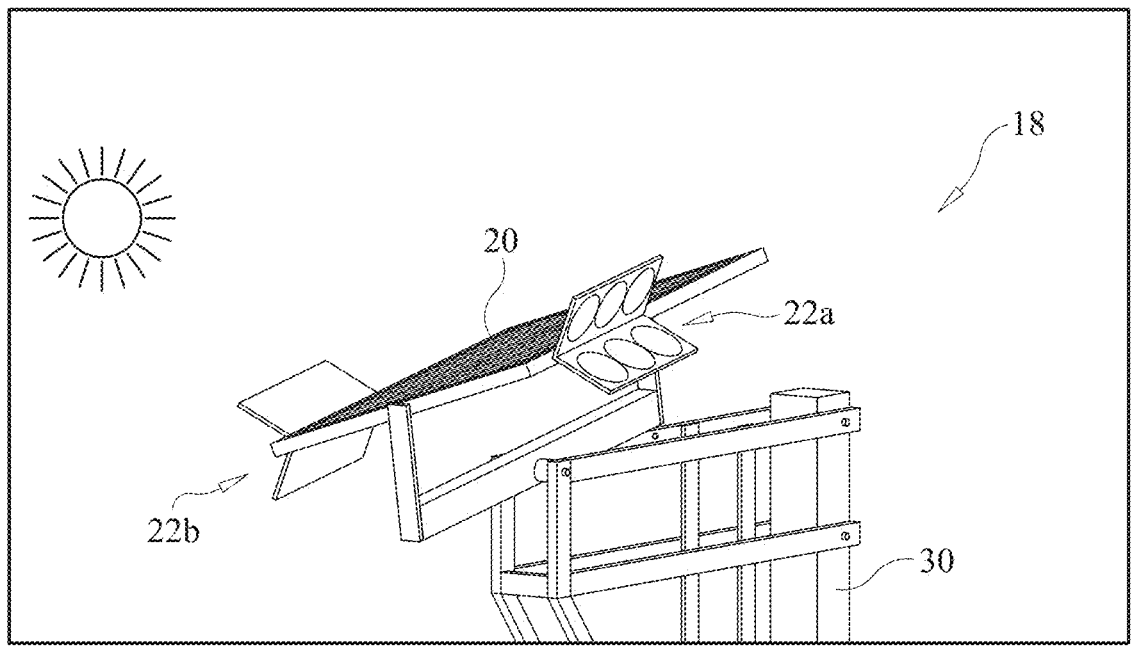
FIG. 7 illustrates the panel arrangement of the solar panel tracking system and energy network of the present disclosure in late afternoon as the sun begins to set.

In FIG. 7, system 18, utilizing tracking wings 22a and 22b, have followed the path of the sun throughout the afternoon until late in the day. By moving along the sun's path, main panel 20 is moved incrementally so that it is always directly facing the sun, therefore generating the maximum amount of electricity. Eventually, as the sun lowers in the horizon, the panels of system 18 will move once again to the position shown in FIG. 3 where they will stop and remain there during the night. This can occur either by activating a limit switch, which acts as protection for the tracking motor, or because it has stopped due to the absence of sunlight due to the evening clouds. The panels remain in this position until sunlight is detected in the opposite horizon the following horizon.

It should be noted that when tracking wings 22a and 22b follow the sun throughout the day, the transition voltage winds up being developed on the lower left wing only. This is because both upper and lower tracking wings can each produce a maximum of approximately 7 volts at 40 milliamps, but only exceeding approximately 3 volts at 20 milliamps is needed to start the tracking motor.

Figure 8:
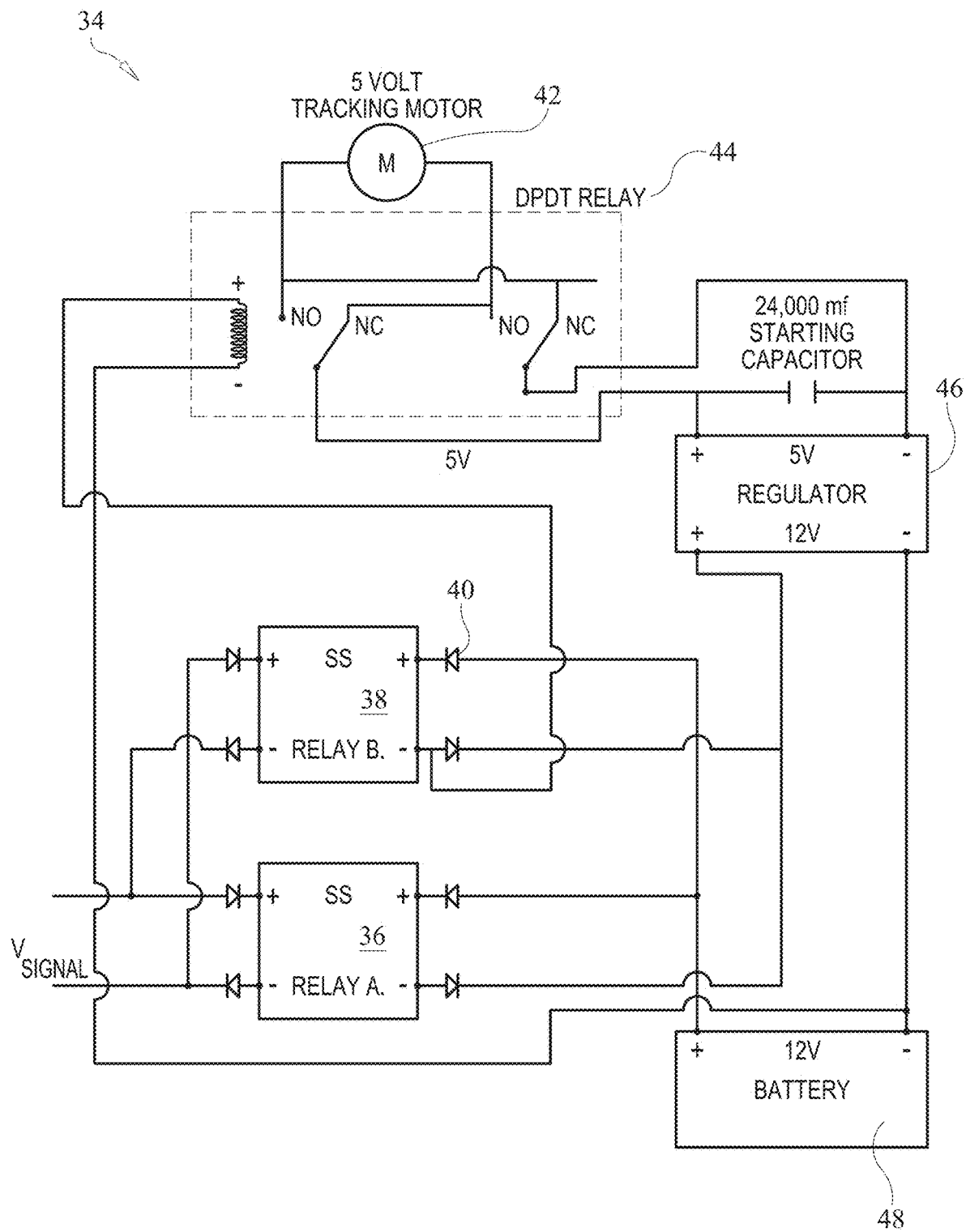
FIG. 8 is an electrical circuit diagram showing how the tracking motor is activated upon receipt of the requisite voltage.

FIG. 8 illustrates an exemplary analog control circuit 34 that controls the operation of system 18 in the manner described herein. The front end of analog control circuit 34 is designed with two solid state relays, relay A 36 and relay B 38. The inputs and outputs of each relay are isolated from each other by diodes 40. A solid state relay is chosen because the coil equivalent only requires 20 milliamps at a three volt DC minimum to operate. The inputs, outputs, and coil equivalents are separated by diodes 40 because of their sensitive biased internal elements. Mechanical relays do not have this issue.

In FIG. 8, in one non-limiting embodiment, when $V_{signal}$ is approximately +3 volts or higher, an electromechanical tracking motor 42 may begin to turn, incrementally, which in turn moves the entire solar panel system 18 including the main energy generation panel 20 in the same direction that the sun is moving. The result is that the main energy generation panel 20 is once again directly facing the sun in order to capture the sun's rays and generate the optimal amount of solar energy.

As the comparator circuit 10 aligns main panel 20 of system 18 in accordance with the position of the sun, $V_{signal}$ drops below 3 volts and tracking motor 42 stops. Thus, in one embodiment, the movement of main panel 20 ceases when $V_{signal}$ falls below approximately 3 volts for following the daily sun and approximately minus 3 volts for heading towards the morning sun. This process continues until the sun sets or a travel limit on the system 18 is reached. The next day, when the sun comes up on the opposite horizon, a properly designed comparator circuit 10 will "see" the sunlight. When $V_{signal}$ is 3 volts or greater in the negative direction, tracking motor 42 will turn in the opposite direction until $V_{signal}$ again falls within the 3 volt designed range. At that point, the comparator is lining up with the sun or is at a travel limit.

In one embodiment, control circuit 34 includes a double pole double throw (DPDT) mechanical relay 44 shown in FIG. 8, which operates as the forward and reverse switching device. The purpose of voltage regulator 46 shown in FIG. 8 is to provide a continuous regulated 5 volts DC to circuit 34 regardless of the battery voltage supplied to the system. Battery 48 provides power to the circuit 34.

Figure 9:
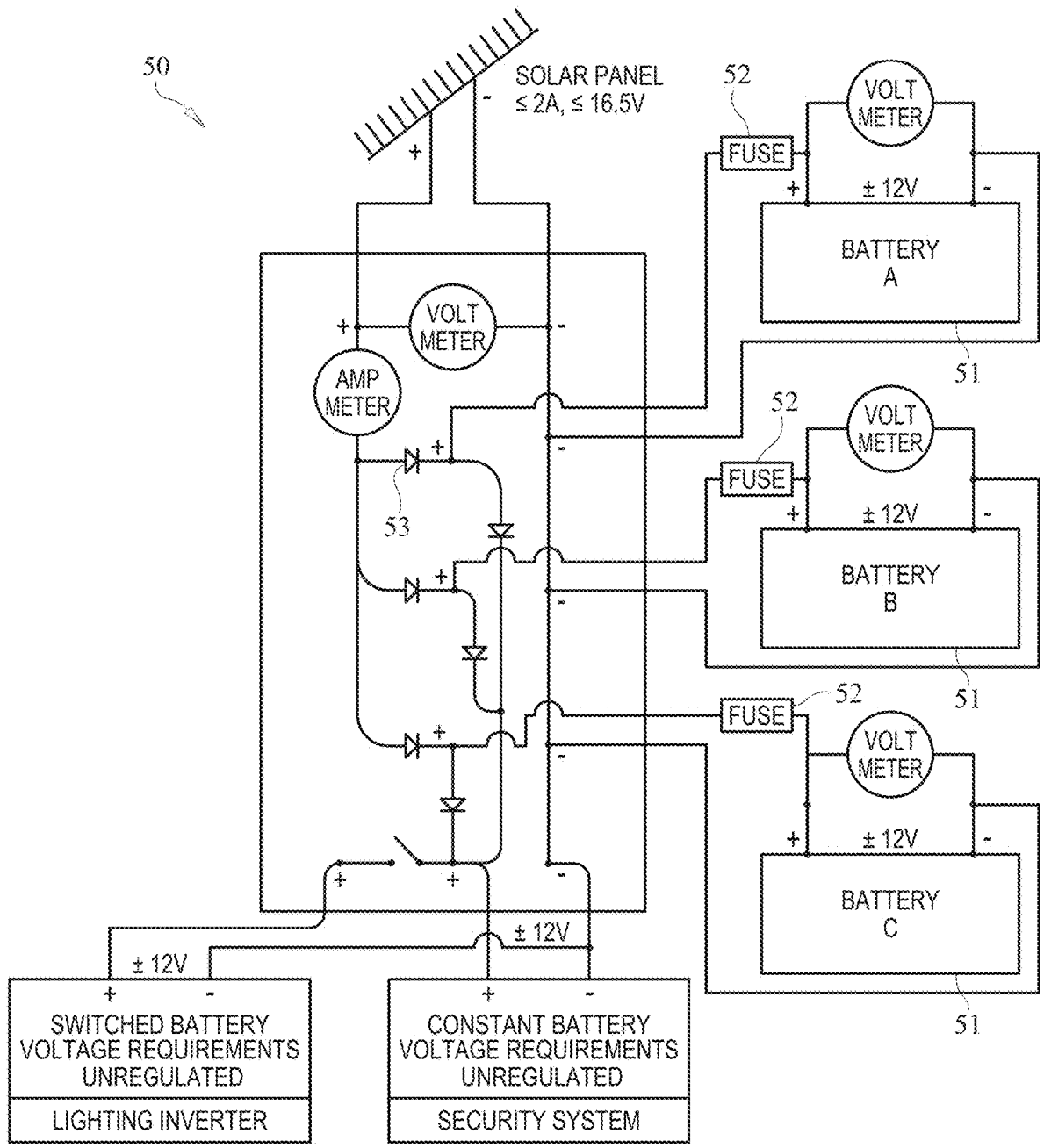
FIG. 9 is an electrical circuit diagram showing how the solar panel tracking system and energy network of the present disclosure provides power to multiple components.

Referring now to FIG. 9, an electrical circuit diagram of an exemplary battery network 50 is depicted, showing how the solar panel tracking system 18 of the present disclosure provides power to multiple components is shown. The generated power is sent through a diode (rectifier) network to multiple batteries 51 A, B and C. In one embodiment, the network is designed for a max current of 2 Amps. In one non-limiting embodiment, the fuses 52 protecting each battery 51 are rated at 10 Amps. If the total solar generation is required to be scaled up exceeding a 2 Amp battery tender threshold, then current regulation can be easily and inexpensively applied to keep the individual batteries 51 charging/tending current at or below 2 Amps. The diodes (rectifiers) 53 in the battery network 50 may also be scaled up to handle the additional generated solar energy and network energy for 12 Volt applications.

Figure 10:
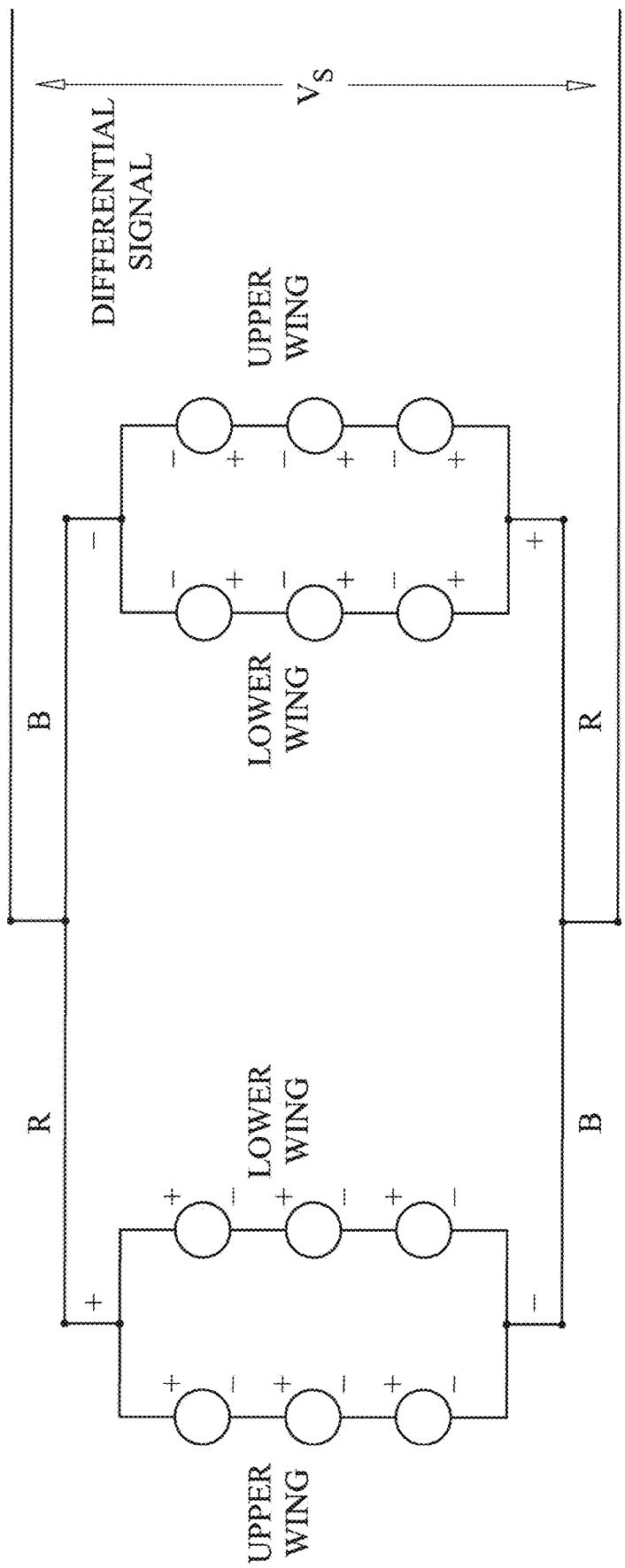
FIG. 10 is an electrical circuit diagram of the solar comparator in accordance with the principles of the present disclosure.

FIG. 10 is an electrical circuit diagram showing, in an exemplary embodiment, the solar comparator wiring in accordance with the principals of the present disclosure. Here, as shown in FIG. 1D, the $-V_{signal}$ coincides with a near full voltage of approximately −7 volts, when the tracking panels are finding the morning sun. When $V_{signal}$ is approximately +3 volts, this is a transition voltage, i.e., when $V_{signal}$ is greater than approximately +3 volts, the panels are operating the tracking motor, and when $V_{signal}$ is less than approximately +3 volts, the panels stop operating the tracking motor. As shown in FIG. 1E, the lower left panel usually generates the transition voltage to operate the tracking panels to follow the sun throughout the day.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A solar tracking and solar energy generation system comprising:
   a solar panel apparatus comprising:
      a main power generating solar panel;
      a first tracking wing situated on a first side of the main solar panel, the first tracking wing comprising upper and lower solar panels each comprised of solar cells, the upper and lower solar panels are offset with respect to each other by an angle;
      a second tracking wing situated on a second side of the main solar panel, the second tracking wing comprising upper and lower solar panels each comprised of solar cells, the upper and lower solar panels are offset with respect to each other by an angle;
   a tracking motor electrically coupled to the main solar panel, the tracking motor, upon receipt of a requisite voltage, configured to move the main solar panel incrementally in a direction corresponding to the direction of the sun's motion throughout the day;

a comparator circuit electrically connected to the tracking wings, the comparator circuit configured to generate an input voltage signal to a control circuit to drive the tracking motor, the input voltage signal generated when a lower solar panel on one tracking wing receives more sunlight than a lower solar panel on an opposing tracking wing by a predetermined amount; and a support mechanism securing the solar panel apparatus to a structure, the support mechanism comprising:

a support pole; and a pole collar sized to receiver the support pole, the pole collar configured to be mounted to the structure to prevent the support pole from bending due to imbalance caused by the solar panel apparatus, wherein the solar panel apparatus is situated above a pivot point, the solar tracking system further comprising a counterbalance situated at the pivot point.

2. The solar tracking system of claim 1, wherein the solar cells on the upper solar panel of each tracking wing are electrically connected in parallel with the solar cells on the lower solar panel of the same tracking wing.

3. The solar tracking system of claim 1, wherein the solar panels of the first tracking wing are electrically connected in series with the solar panels of the second tracking wing.

4. The solar tracking system of claim 1, wherein the predetermined angle is substantially 90 degrees.

5. The solar tracking system of claim 1, further comprising a digital programmable timer with an internal relay switch to limit the solar tracking system to discrete operational time intervals.

6. The solar tracking system of claim 1, further comprising an override motor circuit applied to make seasonal adjustments for the angle of the sun over the horizon.

7. The solar tracking system of claim 1, further comprising a manual adjustment to account for change in the arc of the sun through the seasons due to the tilt in the earth's axis.

8. The solar tracking system of claim 1, further comprising at least one limit switch, the at least one limit switch configured to stop the tracking motor at one or more preset locations.

* * * * *